(12) United States Patent
Cevahir

(10) Patent No.: US 10,970,647 B1
(45) Date of Patent: Apr. 6, 2021

(54) DEEP FEATURE GENERATION FOR CLASSIFICATION

(71) Applicant: Facebook, Inc., Menlo Park, CA (US)

(72) Inventor: Hüseyin Kerem Cevahir, London (GB)

(73) Assignee: Facebook, Inc., Menlo Park, CA (US)

( * ) Notice: Subject to any disclaimer, the term of this patent is extended or adjusted under 35 U.S.C. 154(b) by 891 days.

(21) Appl. No.: 15/678,952

(22) Filed: Aug. 16, 2017

(51) Int. Cl.

| G06N 20/00 | (2019.01) |
|---|---|
| H04L 12/58 | (2006.01) |
| G06F 21/50 | (2013.01) |
| H04L 29/06 | (2006.01) |
| H04L 12/24 | (2006.01) |

(52) U.S. Cl.
CPC ............. *G06N 20/00* (2019.01); *G06F 21/50* (2013.01); *H04L 41/16* (2013.01); *H04L 51/12* (2013.01); *H04L 51/32* (2013.01); *H04L 63/1425* (2013.01)

(58) Field of Classification Search
CPC ......... G06N 20/00; G06F 21/50; H04L 41/16; H04L 51/12; H04L 51/32; H04L 63/1425
USPC ........................................................ 706/20
See application file for complete search history.

(56) References Cited

U.S. PATENT DOCUMENTS

| 2015/0188941 A1* | 7/2015 | Boshmaf | H04L 63/1441 726/22 |
|---|---|---|---|
| 2017/0147676 A1* | 5/2017 | Jaidka | G06F 16/35 |
| 2017/0185911 A1* | 6/2017 | Fang | G06N 5/022 |
| 2018/0262525 A1* | 9/2018 | Yan | G05B 13/0265 |

OTHER PUBLICATIONS

Adewole et al., "Malicious accounts: Dark of the social networks", Journal of Network and Computer Applications 79 (2017) 41-67. Available online Nov. 29, 2016. (Year: 2017).*

Cao et al., "Discovering hidden suspicious accounts in online social networks", Information Sciences 394-395 (2017) 123-140. Available online Feb. 16, 2017. (Year: 2017).*

* cited by examiner

Primary Examiner — Dave Misir
(74) Attorney, Agent, or Firm — Baker Botts L.L.P.

(57) ABSTRACT

In one embodiment, a method includes a device configured to obtain a plurality of sparse, categorical, and numerical features. The device may generate a plurality of ordered combinations of features, wherein each ordered combination of features comprises at least a first feature and a second feature. The device may identify a user account of a social networking system and generate one or more deep feature values associated with the user account for each of the plurality of ordered combination of features. The generation may comprise extracting a first feature value and a second feature value associated with the user account using a social graph of the social networking system. The first and second feature values correspond to the first and second features of the ordered combination of features, respectively. The device may then train a machine-learning model using the generated deep feature values associated with the user account.

20 Claims, 4 Drawing Sheets

DEEP FEATURE GENERATION FOR CLASSIFICATION

TECHNICAL FIELD

This disclosure generally relates to systems and methods for generating features to be used with a machine-learning model for spam detection.

BACKGROUND

"Spam" is a general term used to refer to unwanted or unsolicited electronic messages, such as advertisements. Spam messages could be distributed as conventional e-mails, text messages, instant messages, blogs, and other types of communication medium. Increasingly, spam is being distributed through social-networking systems. The social-networking platform provides a variety of channels for spam to be distributed. For example, a spammer may distribute spam messages by posting messages, commenting on others' posts, sending instant messages, among others.

Spammers, unlike conventional users of a social-networking system, may be considered as adversaries to the system through which spam is disseminated. Spammers and the system have opposing agendas—spammers want to disseminate spam, and the system wants to prevent such dissemination. Thus, just as the system is constantly trying to block spamming, spammers are constantly trying to circumvent the system's spam-blocking efforts.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments described herein relates to a method for automatically generating "deep" features that may be used to detect fake user or entity accounts, which are typically created for spamming. One challenge of combating spam is that spammers, who can be considered as adversaries, constantly adapt to and circumvent spam-filtering processes. For example, once a spammer figures out which account features are being used as signals for fake accounts, the spammer may modify its behavior and account characteristics to circumvent the detection process. As such, features (e.g., age, home town, education of the account holder, online hours, etc.) that can be easily and unilaterally changed by the classification target (in this case, the spammer) may be less effective in adversarial classification. Instead, deep features which are derived from many different entities to which the classification target is connected but cannot control directly is much more resilient to adversarial manipulation. Thus, one goal of the instant systems/methods is to automatically generate numerous and deep features that are difficult or expensive to circumvent.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
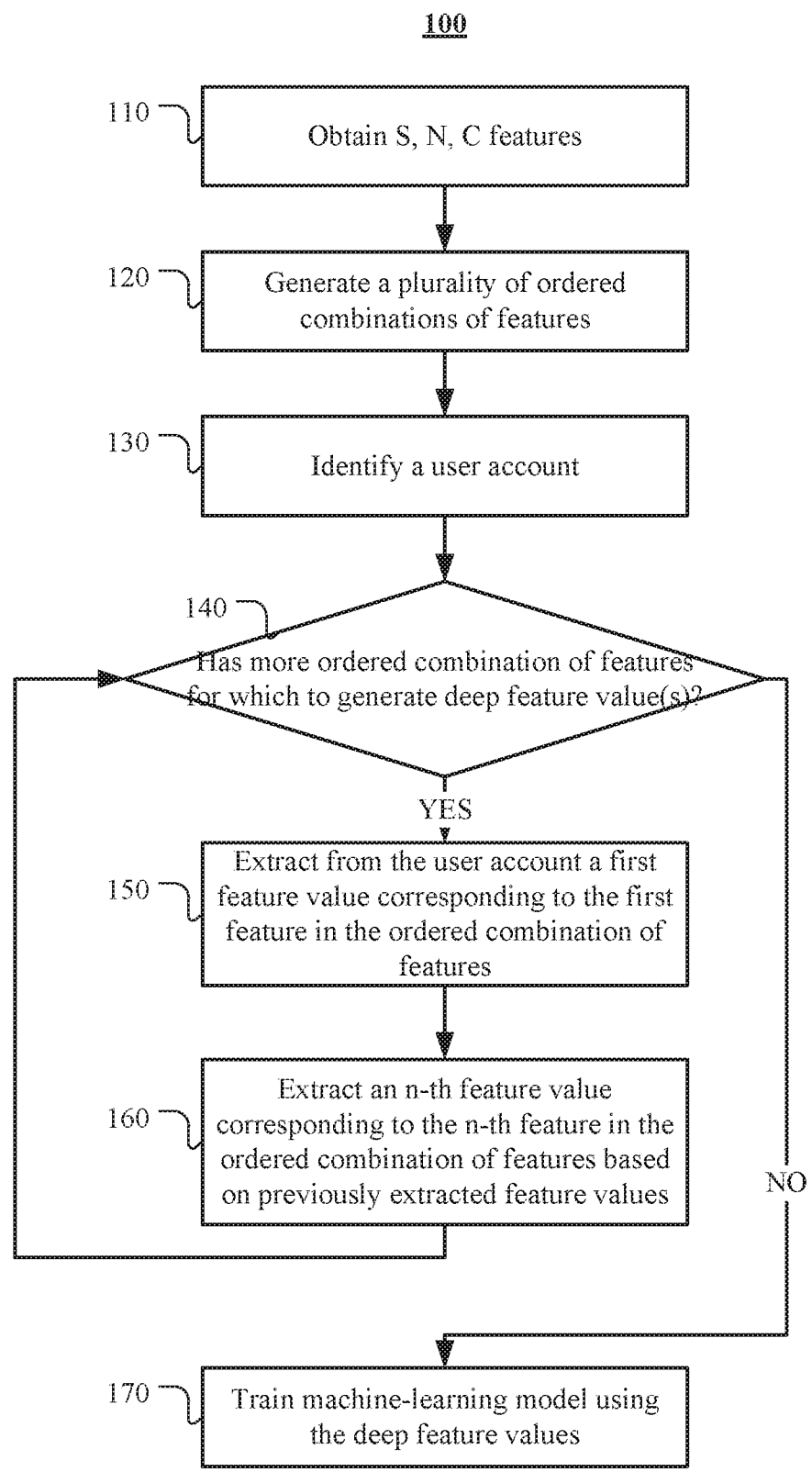
FIG. 1 illustrates an example method for training a machine-learning model using automatically generated deep features.

Particular embodiments described herein relates to an efficient and automated process for extracting deep feature values. At a high level, the feature-extraction framework is capable of automatically inferring complex, deep features from a relatively small initial direct feature set. For instance, from 60 basic features, the framework may automatically, in real-time, generate more than 6000 deep features. Further, the initial feature set may include sparse features, such as information related to an account user's friends or friends of friends, the pages that he manages, other users whom he follows, pages that he subscribes to, etc. The resulting number of features and their deep characteristics greatly increase the difficulty level for spammers to fabricate the desired feature characteristics to avoid detection. For instance, while it may be easy for a spammer to change his geographic location, profile information, online behavior pattern, and other characteristics under his direct control, it would be much more difficult for the spammer to fabricate deep features such as profile information of friends of friends, their online behavior patterns, etc.

The framework described herein provide a scalable way to generate deep, complex features, leveraging the vast amount of data in a social-networking system's social graph. The automatically generated features may then be used to train machine-learning models to detect fake or spammer accounts, including single accounts acting independently.

In particular embodiments, the framework may define direct features with corresponding feature types for entities (e.g., users, organizations, clubs, etc.) within a social graph. A direct feature may be any feature that can be extracted directly from an entity's information. The following are non-exhaustive examples of such direct features: a user's "friends" (used herein to refer to other users who are within one degree of separation from the user), organizations that the user is following, place of residence, age of the user's account, etc. In particular embodiments, each entity may have a configuration file that lists the direct features of interest.

In particular embodiments, each defined feature may have a feature type. Examples of feature types include, e.g., numeric features, categorical features, and sparse features. Numeric features may be any feature which can be represented as sortable/comparable values. Comparisons of such values have logical meaning. In particular embodiments, the programming data type of numeric features may be float. Examples of numeric features include, e.g., the age of an account since creation, the number of days since the user last logged into his/her account, time of last interaction on the social-networking system, age of the user, etc.

Another example feature type is categorical features, which may be any feature which describes state, category, or type. In contrast to numeric features, direct comparison of categorical feature values may not have any meaning (e.g., comparing area codes). Examples of categorical features may include, e.g., a user's country of origin, state in which he/she lives in, area code, gender, marital status, any system-generated flags (e.g., indicating that the account has been disabled), etc.

Another example feature type is sparse features, which may be any feature which can be represented as a set of entities with optional weights. In particular embodiments, a sparse feature value may be a small subset selected from a relatively much larger set. For examples, a sparse feature may include, e.g., a user's friends (or their corresponding IDs in the social-networking system), other users whom the user messaged or engaged with, pages (e.g., represented by page IDs in the social-networking system) on the social-networking system that the user likes or administers, devices used by a user to log into the social-networking system, DATRs, IP addresses, etc. In particular embodiments, certain sparse features may be weighted. The weight is a feature characteristic that weighs the sparse relationship between the data owner and the target entity. Time decay is an example of a sparse feature weight. Sparse features which describe a state usually do not decay over time (e.g., being a friend). However, sparse features which describe an event may decay over time (e.g., most sentry categories, sending a friend request, accepting a friend request, logging in from a device, etc.). To represent decrease in feature value (value as in signal worth or significance), the framework may decrease its representation in aggregation by a given amount. For example, if a default weight for a sparse feature is 0.05, after 30 days the weight may be reduced to 0.02, and after 90 days it may further be reduced to 0.01. The generated features may be time-sensitive by default, since what happened recently and what happened in the past may be represented accordingly using time decay weights. In particular embodiments, the data type of a sparse feature may be <int, float>, where int is an integer data type that identifies the entity and float indicates the weight (default=1.0) for the particular sparse relationship between the data owner and target entity type.

In particular embodiments, a system administrator may define several direct features as described above and use such features to determine whether a particular user is a spammer or whether a particular content is spam. For example, if a suspect user account indicates that its user is from a geographic region from which spam often originates, has a young account age (e.g., less than 30 days), has very few friends (e.g., less than 5), then the system may predict based on these features that the suspect user account may be a spammer account. However, if the suspected user account is indeed owned by a spammer, the spammer may try to avoid detection by changing those account details so that it would no longer fit the spammer profile. For instance, the spammer may change the geographic region indicated in the account profile, use older accounts, and befriend more users (some of which may be other fake accounts created by the spammer). Since the spammer has direct control over the data used for spam detection, he may more easily circumvent the spam-detection system. Further, since the number of such manually defined features may be limited (e.g., 20, 30, 60, etc.), the scope of data that needs to be manipulated in order to circumvent the detection system is limited, which makes it easier for the spammer.

Particular embodiments described herein relates to systems and methods for automatically generating a large number of deep feature values that would be extremely difficult for a spammer to manipulate. Not only are the numerous, they are also deep. In particular embodiments, a deep feature value may not be directly extracted from a target entity's information but may instead be indirectly extracted from other entities connected to the target. In particular embodiments, the system may automatically generate several deep feature definitions by combining predefined, direct features, such as those described above. For example, from a predefined list comprising a "friends" feature and "country" feature, the system may automatically generate a "friends.friends.country" deep feature, which represents the countries in which friends of friends of the target user are located. In particular embodiments, the system may also apply one or more aggregation operations to the data. For example, an aggregation operation may aggregate features of entities of a sparse feature (non-zero or non-null values). Continuing the example above, the system may apply an aggregation operation on the "friends.friends.country" feature to count the number of friends of friends of the target user who are from the same country. Thus, based on the this process, the system may use an initial set of features to automatically define additional deep features, and extract corresponding deep feature values accordingly. For instance, given an initial set of features (e.g., 20× numerical features, 20× categorical features, and 30× sparse features), the framework may take the cross product or explore different permutations of the features in the set to automatically generate thousands of deep features. For example, from the initial set of features {Account_Age, Country, Friends, and Messaged Users}, the following features may be generated:

Number of friends
Number of friends from same country
Number of friends from top country among friends
75th-percentile of Account_Age of friends
Number of messaged users
Number of messaged users from same country
Number of messaged users from top country among friends
75th-percentile of Account_Age of messaged users In particular embodiments, the generated feature combinations may be represented by a hierarchical relationship between an ordered list of features, and may be defined based on feature types. The system may automatically generate different permutations of features to generate deep, combined features. In particular embodiments, the system may generate deep features based on predetermined combination rules. In particular embodiments, the combination rules may be defined based on feature types. For instance, one combination rule may require a top-level feature, or the first ordered feature in a combination, to be a sparse feature, such as entities, devices, DATRs, photos, pages, groups, etc. The second-level feature may be another sparse feature, a numeric feature, or a categorical feature. The system may create any number of combined deep features using the predefined features so long as the combination rule is satisfied. In particular embodiments, the combination rules may also define a maximum number of features that may be used in a combination. For example, if the maximum number is 3, the system may generate 1-feature combinations, 2-feature combinations, and 3-feature combinations. For instance, the system may generate features based on the following rules, using S to denote any sparse feature (e.g., friends), N to denote any numeric feature, and C to denote any categorical feature:

S1: Represents a single sparse feature (e.g., friends).
S1→S2: Represents a sparse feature of another sparse feature (e.g., friends of friends)
S1→N1: Represents a numeric feature of a spare feature (e.g., account age of friends)
S1→C1: Represents a categorical feature of a sparse feature (e.g., country of friends)
S1→S2→S3: Represents a sparse feature of another spare feature of yet another sparse feature (e.g., pages followed by friends of friends)
S1→S2→N1: Represents a numeric feature of a sparse feature of another sparse feature (e.g., account age of friends of friends)
S1→S2→C1: Represents a categorical feature of a sparse feature of another sparse feature (e.g., country of friends of friends).

In particular embodiments, the combination rules may further define aggregation operations for different feature types. Examples of aggregation operations include, e.g., COUNT( ), SAME_COUNT( ), P75( ), and DENSITY( ). Each operation may have one or more defined types of data that it can operate on. For example, COUNT(S) can operate on sparse features, P75(N) can operate on numeric features, SAME RATIO(C) can operate on categorical features, and so on. The feature type of a deep combination feature may be based on the feature type of the last feature in the combination. For example, the ending feature type of S1→S2→N1 is numerical, and as such an aggregation operation for numerical features such as P75(N) may be applied to the deep feature. As another example, the ending feature type of S1→S2→S3 is sparse, and as such an aggregation operation for sparse features such as COUNT (S) may be used. In particular embodiments, the framework may generate every permutation of the features based on the combination rules and apply any and all suitable operation to any and all suitable feature combination. Thus, in particular embodiments a deep feature may be generated based on an aggregation operation plus a feature combination. In particular embodiments, during feature extraction, for each of the generated feature combination, the system may traverse its database (e.g., social graph) to retrieve the desired information and compute the feature value. Examples of aggregated features include:

COUNT(friends.friends): Count of friends of friends.
SAME_COUNT(users_i_messaged.friends.country): Count of friends of the messaged users' from the same country.
P75(pages.admins.account_age): 75th percentile of account age of the admins of the liked pages.
DENSITY(logged_in_devices.logged_in_users): Density (repetition) of users logged in from the same devices.
TRUE COUNT(pages_admined.admins.is_fa_checkpointed): Count of administrators of pages administered by the user who have been checked pointed.
COMMON RATIO(logged_in_devices.logged_in_users): Ratio of user who logged in from same device.
SAME_COUNT(users_i_reported.social_hash): Count of reported users with the same social hash.

In particular embodiments, the generated deep features may be used by machine-learning models to detect fake accounts. In an embodiment with a few direct features and thousands of generated deep features, neural networks plus Sigrid may be a suitable machine-learning model because of the high number of numeric features. The training data used for training the machine-learning model may be based in part on random sampling. Generally in machine learning applications, engineers log data for the interested event (e.g. news feed features at time of story ranking), but this does not apply for adversarial domains well, simply because there is no single common event for all attacks. This may be addressed by sampling from random HTTP GET requests to the social-networking system and generating features based on the request's User ID. This enables the model to be applicable for any context/product on the system, and result in a ready-to-use feature set that describes how user interacts with the system. Once trained, the model may be used by the system to predict whether a suspect account or content is related to spam. For example, the system may automatically extract the deep features used in the machine-learning training from the suspect account, and then feed the extracted features into the model. The model may then output a prediction of whether the suspect account is likely related to spam. Since thousands of deep, complex features are used in the prediction, it would be extremely difficult for spammers to "game" the spam-detection system to avoid detection.

FIG. 1 illustrates an example method 100 for training a machine-learning model using automatically generated deep features. The method may begin at step 110, where a computing device may obtain a plurality of sparse features, a plurality of categorical features, and a plurality of numerical features. For example, sparse features may include friends, pages visited, pages administered, etc.; categorical features may include gender, country of residence, etc.; and numerical features may include age of account, time since last login, etc. At step 120, the computing device may generate a plurality of ordered combinations of features, wherein each ordered combination of features comprises at least a first feature and a second feature, wherein the first feature is selected from the plurality of sparse features, and wherein the second feature is selected from the plurality of sparse features, the plurality of categorical features, or the plurality of numerical features. In particular embodiments, the ordered combinations of features may be generated based on combination rules (e.g., S1→S2→C1). As an example, one ordered combination of features may be friends.friends.country. In this example, the ordered combination has three features, the first being "friends," the second being "friends," and the third being "country." At step 130, the device may identify a user account of a social networking system. For example, the social-networking system may access a target user's account and generate an associated deep feature. In particular embodiments, the system may know whether the user account is associated spamming activity or not. In particular embodiments, the system may not know whether the user account is associated with spamming activity. At 140, the device may generate one or more deep feature values associated with the user account for each of the plurality of ordered combination of features. Traversing through each of the ordered combination of features, the device may generate a corresponding deep feature(s). The generation of the deep feature may involve, at step 150, extracting a first feature value associated with the user account using a social graph of the social networking system, wherein the first feature value corresponds to the first feature of the ordered combination of features. Using the aforementioned example of friend.friend.country as an ordered combination of features currently being processed, the device may access a social graph and identify all friends connected to the user account (e.g., friends may be those who are within 1 degree of separation from the user). Then at step 160, the device may continue to extract, e.g., a second feature value associated with the user account using the extracted first feature value and the social graph of the social networking system, wherein the second feature value corresponds to the second feature of the ordered combination of features. Continuing with the friend.friend.country example, the device may then identify all friends of the friends identified in step 150. Subsequently, the device may further identify the countries of origin of each of those friends identified in step 160. After deep features values have been generated for the ordered combination of features, the device at 170 may train a machine-learning model using the generated deep feature values associated with the user account. The process described above (e.g., steps 130-160) may be applied to hundreds or thousands of other user accounts to generate a robust set of training data with a set of automatically generated deep feature values. Any suitable machine-learning algorithm may be used, such as neural networks. In particular embodiments, the trained machine-learning model may then be used to classify whether a suspected user account is associated with spamming activity or not based on automatically generated deep feature values associated with that suspected user account. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for training a machine-learning model using automatically generated deep features, including the particular steps of the method of FIG. 1, this disclosure contemplates any suitable method for training a machine-learning model using automatically generated deep features, including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 2:
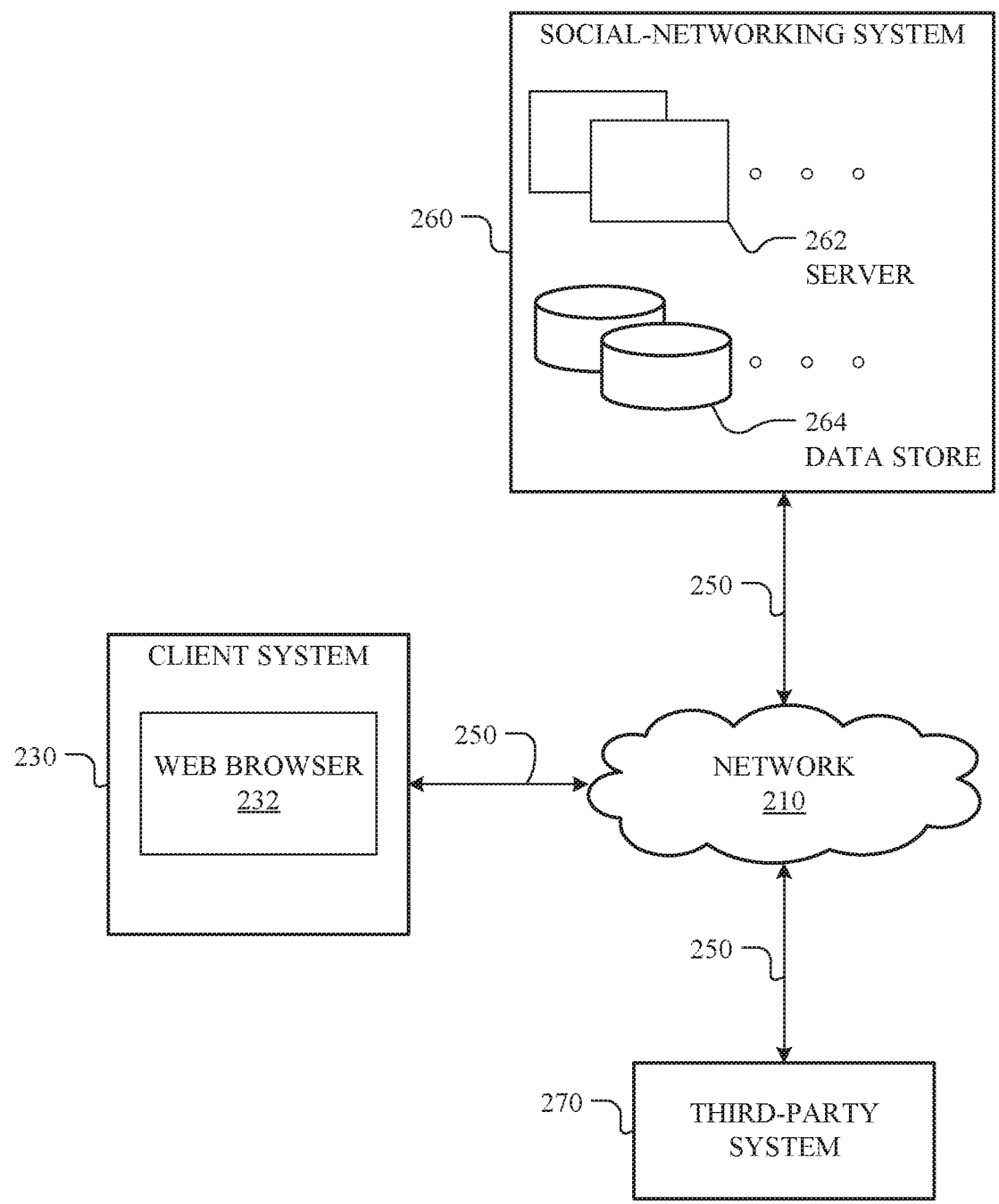
FIG. 2 illustrates an example network environment associated with a social-networking system.

FIG. 2 illustrates an example network environment 200 associated with a social-networking system. Network environment 200 includes a client system 230, a social-networking system 260, and a third-party system 270 connected to each other by a network 210. Although FIG. 2 illustrates a particular arrangement of client system 230, social-networking system 260, third-party system 270, and network 210, this disclosure contemplates any suitable arrangement of client system 230, social-networking system 260, third-party system 270, and network 210. As an example and not by way of limitation, two or more of client system 230, social-networking system 260, and third-party system 270 may be connected to each other directly, bypassing network 210. As another example, two or more of client system 230, social-networking system 260, and third-party system 270 may be physically or logically co-located with each other in whole or in part. Moreover, although FIG. 2 illustrates a particular number of client systems 230, social-networking systems 260, third-party systems 270, and networks 210, this disclosure contemplates any suitable number of client systems 230, social-networking systems 260, third-party systems 270, and networks 210. As an example and not by way of limitation, network environment 200 may include multiple client system 230, social-networking systems 260, third-party systems 270, and networks 210.

This disclosure contemplates any suitable network 210. As an example and not by way of limitation, one or more portions of network 210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 210 may include one or more networks 210.

Links 250 may connect client system 230, social-networking system 260, and third-party system 270 to communication network 210 or to each other. This disclosure contemplates any suitable links 250. In particular embodiments, one or more links 250 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 250 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 250, or a combination of two or more such links 250. Links 250 need not necessarily be the same throughout network environment 200. One or more first links 250 may differ in one or more respects from one or more second links 250.

In particular embodiments, client system 230 may be an electronic device including hardware, software, or embedded logic components or a combination of two or more such components and capable of carrying out the appropriate functionalities implemented or supported by client system 230. As an example and not by way of limitation, a client system 230 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 230. A client system 230 may enable a network user at client system 230 to access network 210. A client system 230 may enable its user to communicate with other users at other client systems 230.

In particular embodiments, client system 230 may include a web browser 232, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 230 may enter a Uniform Resource Locator (URL) or other address directing the web browser 232 to a particular server (such as server 262, or a server associated with a third-party system 270), and the web browser 232 may generate a Hyper Text Transfer Protocol (HTTP) request and communicate the HTTP request to server. The server may accept the HTTP request and communicate to client system 230 one or more Hyper Text Markup Language (HTML) files responsive to the HTTP request. Client system 230 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 260 may be a network-addressable computing system that can host an online social network. Social-networking system 260 may generate, store, receive, and send social-networking data, such as, for example, user-profile data, concept-profile data, social-graph information, or other suitable data related to the online social network. Social-networking system 260 may be accessed by the other components of network environment 200 either directly or via network 210. As an example and not by way of limitation, client system 230 may access social-networking system 260 using a web browser 232, or a native application associated with social-networking system 260 (e.g., a mobile social-networking application, a messaging application, another suitable application, or any combination thereof) either directly or via network 210. In particular embodiments, social-networking system 260 may include one or more servers 262. Each server 262 may be a unitary server or a distributed server spanning multiple computers or multiple datacenters. Servers 262 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 262 may include hardware, software, or embedded logic components or a combination of two or more such components for carrying out the appropriate functionalities implemented or supported by server 262. In particular embodiments, social-networking system 260 may include one or more data stores 264. Data stores 264 may be used to store various types of information. In particular embodiments, the information stored in data stores 264 may be organized according to specific data structures. In particular embodiments, each data store 264 may be a relational, columnar, correlation, or other suitable database. Although this disclosure describes or illustrates particular types of databases, this disclosure contemplates any suitable types of databases. Particular embodiments may provide interfaces that enable a client system 230, a social-networking system 260, or a third-party system 270 to manage, retrieve, modify, add, or delete, the information stored in data store 264.

In particular embodiments, social-networking system 260 may store one or more social graphs in one or more data stores 264. In particular embodiments, a social graph may include multiple nodes—which may include multiple user nodes (each corresponding to a particular user) or multiple concept nodes (each corresponding to a particular concept)—and multiple edges connecting the nodes. Social-networking system 260 may provide users of the online social network the ability to communicate and interact with other users. In particular embodiments, users may join the online social network via social-networking system 260 and then add connections (e.g., relationships) to a number of other users of social-networking system 260 to whom they want to be connected. Herein, the term "friend" may refer to any other user of social-networking system 260 with whom a user has formed a connection, association, or relationship via social-networking system 260.

In particular embodiments, social-networking system 260 may provide users with the ability to take actions on various types of items or objects, supported by social-networking system 260. As an example and not by way of limitation, the items and objects may include groups or social networks to which users of social-networking system 260 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 260 or by an external system of third-party system 270, which is separate from social-networking system 260 and coupled to social-networking system 260 via a network 210.

In particular embodiments, social-networking system 260 may be capable of linking a variety of entities. As an example and not by way of limitation, social-networking system 260 may enable users to interact with each other as well as receive content from third-party systems 270 or other entities, or to allow users to interact with these entities through an application programming interfaces (API) or other communication channels.

In particular embodiments, a third-party system 270 may include one or more types of servers, one or more data stores, one or more interfaces, including but not limited to APIs, one or more web services, one or more content sources, one or more networks, or any other suitable components, e.g., that servers may communicate with. A third-party system 270 may be operated by a different entity from an entity operating social-networking system 260. In particular embodiments, however, social-networking system 260 and third-party systems 270 may operate in conjunction with each other to provide social-networking services to users of social-networking system 260 or third-party systems 270. In this sense, social-networking system 260 may provide a platform, or backbone, which other systems, such as third-party systems 270, may use to provide social-networking services and functionality to users across the Internet.

In particular embodiments, a third-party system 270 may include a third-party content object provider. A third-party content object provider may include one or more sources of content objects, which may be communicated to a client system 230. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 260 also includes user-generated content objects, which may enhance a user's interactions with social-networking system 260. User-generated content may include anything a user can add, upload, send, or "post" to social-networking system 260. As an example and not by way of limitation, a user communicates posts to social-networking system 260 from a client system 230. Posts may include data such as status updates or other textual data, location information, photos, videos, links, music or other similar data or media. Content may also be added to social-networking system 260 by a third-party through a "communication channel," such as a newsfeed or stream.

In particular embodiments, social-networking system 260 may include a variety of servers, sub-systems, programs, modules, logs, and data stores. In particular embodiments, social-networking system 260 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 260 may also include suitable components such as network interfaces, security mechanisms, load balancers, failover servers, management-and-network-operations consoles, other suitable components, or any suitable combination thereof. In particular embodiments, social-networking system 260 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 260 to one or more client systems 230 or one or more third-party system 270 via network 210. The web server may include a mail server or other messaging functionality for receiving and routing messages between social-networking system 260 and one or more client systems 230. An API-request server may allow a third-party system 270 to access information from social-networking system 260 by calling one or more APIs. An action logger may be used to receive communications from a web server about a user's actions on or off social-networking system 260. In conjunction with the action log, a third-party-content-object log may be maintained of user exposures to third-party-content objects. A notification controller may provide information regarding content objects to a client system 230. Information may be pushed to a client system 230 as notifications, or information may be pulled from client system 230 responsive to a request received from client system 230. Authorization servers may be used to enforce one or more privacy settings of the users of social-networking system 260. A privacy setting of a user determines how particular information associated with a user can be shared. The authorization server may allow users to opt in to or opt out of having their actions logged by social-networking system 260 or shared with other systems (e.g., third-party system 270), such as, for example, by setting appropriate privacy settings. Third-party-content-object stores may be used to store content objects received from third parties, such as a third-party system 270. Location stores may be used for storing location information received from client systems 230 associated with users. Advertisement-pricing modules may combine social information, the current time, location information, or other suitable information to provide relevant advertisements, in the form of notifications, to a user.

Figure 3:
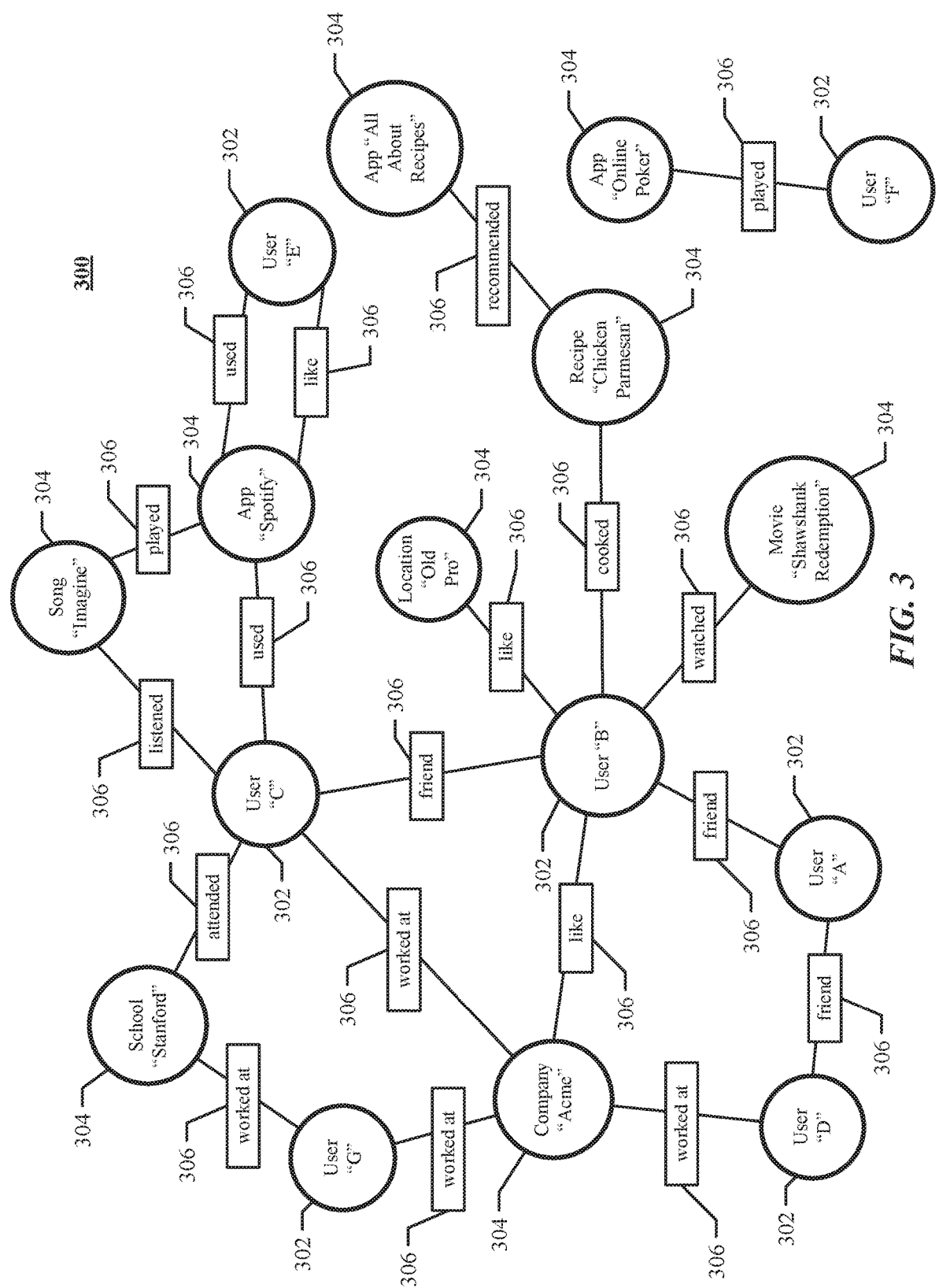
FIG. 3 illustrates an example social graph.

FIG. 3 illustrates example social graph 300. In particular embodiments, social-networking system 260 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 260, client system 230, or third-party system 270 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 260. As an example and not by way of limitation, a user may be an individual (human user), an entity (e.g., an enterprise, business, or third-party application), or a group (e.g., of individuals or entities) that interacts or communicates with or over social-networking system 260. In particular embodiments, when a user registers for an account with social-networking system 260, social-networking system 260 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 260. In particular embodiments, a user node 302 may be associated with information provided by a user or information gathered by various systems, including social-networking system 260. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 260 or a third-party website associated with a web-application server); an entity (such as, for example, a person, business, group, sports team, or celebrity); a resource (such as, for example, an audio file, video file, digital photo, text file, structured document, or application) which may be located within social-networking system 260 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 304 may be associated with information of a concept provided by a user or information gathered by various systems, including social-networking system 260. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 260. Profile pages may also be hosted on third-party websites associated with a third-party system 270. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 270. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 230 to send to social-networking system 260 a message indicating the user's action. In response to the message, social-networking system 260 may create an edge (e.g., a check-in-type edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 260 may send a "friend request" to the second user. If the second user confirms the "friend request," social-networking system 260 may create an edge 306 connecting the first user's user node 302 to the second user's user node 302 in social graph 300 and store edge 306 as social-graph information in one or more of data stores 264. In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to an edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 260 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 260 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 260 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 260 may create an edge 306 between a user node 302 and a concept node 304 in social graph 300. As an example and not by way of limitation, a user viewing a concept-profile page (such as, for example, by using a web browser or a special-purpose application hosted by the user's client system 230) may indicate that he or she likes the concept represented by the concept node 304 by clicking or selecting a "Like" icon, which may cause the user's client system 230 to send to social-networking system 260 a message indicating the user's liking of the concept associated with the concept-profile page. In response to the message, social-networking system 260 may create an edge 306 between user node 302 associated with the user and concept node 304, as illustrated by "like" edge 306 between the user and concept node 304. In particular embodiments, social-networking system 260 may store an edge 306 in one or more data stores. In particular embodiments, an edge 306 may be automatically formed by social-networking system 260 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, social-networking system 260 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 270 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 260 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 260 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 260 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 260 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 260 may calculate a coefficient based on a user's actions. Social-networking system 260 may monitor such actions on the online social network, on a third-party system 270, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 260 may calculate a coefficient based on the user's actions with particular types of content. The content may be associated with the online social network, a third-party system 270, or another suitable system. The content may include users, profile pages, posts, news stories, headlines, instant messages, chat room conversations, emails, advertisements, pictures, video, music, other suitable objects, or any combination thereof. Social-networking system 260 may analyze a user's actions to determine whether one or more of the actions indicate an affinity for subject matter, content, other users, and so forth. As an example and not by way of limitation, if a user frequently posts content related to "coffee" or variants thereof, social-networking system 260 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 260 may calculate a coefficient based on the type of relationship between particular objects. Referencing the social graph 300, social-networking system 260 may analyze the number and/or type of edges 306 connecting particular user nodes 302 and concept nodes 304 when calculating a coefficient. As an example and not by way of limitation, user nodes 302 that are connected by a spouse-type edge (representing that the two users are married) may be assigned a higher coefficient than a user nodes 302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 260 may determine that the user has a higher coefficient with respect to the first photo than the second photo because having a tagged-in-type relationship with content may be assigned a higher weight and/or rating than having a like-type relationship with content. In particular embodiments, social-networking system 260 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 260 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 300. As an example and not by way of limitation, social-graph entities that are closer in the social graph 300 (i.e., fewer degrees of separation) may have a higher coefficient than entities that are further apart in the social graph 300.

In particular embodiments, social-networking system 260 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 230 of the user). A first user may be more interested in other users or concepts that are closer to the first user. As an example and not by way of limitation, if a user is one mile from an airport and two miles from a gas station, social-networking system 260 may determine that the user has a higher coefficient for the airport than the gas station based on the proximity of the airport to the user.

In particular embodiments, social-networking system 260 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 260 may provide information that is relevant to user's interests and current circumstances, increasing the likelihood that they will find such information of interest. In particular embodiments, social-networking system 260 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 260 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 260 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 270 (e.g., via an API or other communication channel), or from another suitable system. In response to the request, social-networking system 260 may calculate the coefficient (or access the coefficient information if it has previously been calculated and stored). In particular embodiments, social-networking system 260 may measure an affinity with respect to a particular process. Different processes (both internal and external to the online social network) may request a coefficient for a particular object or set of objects. Social-networking system 260 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 4:
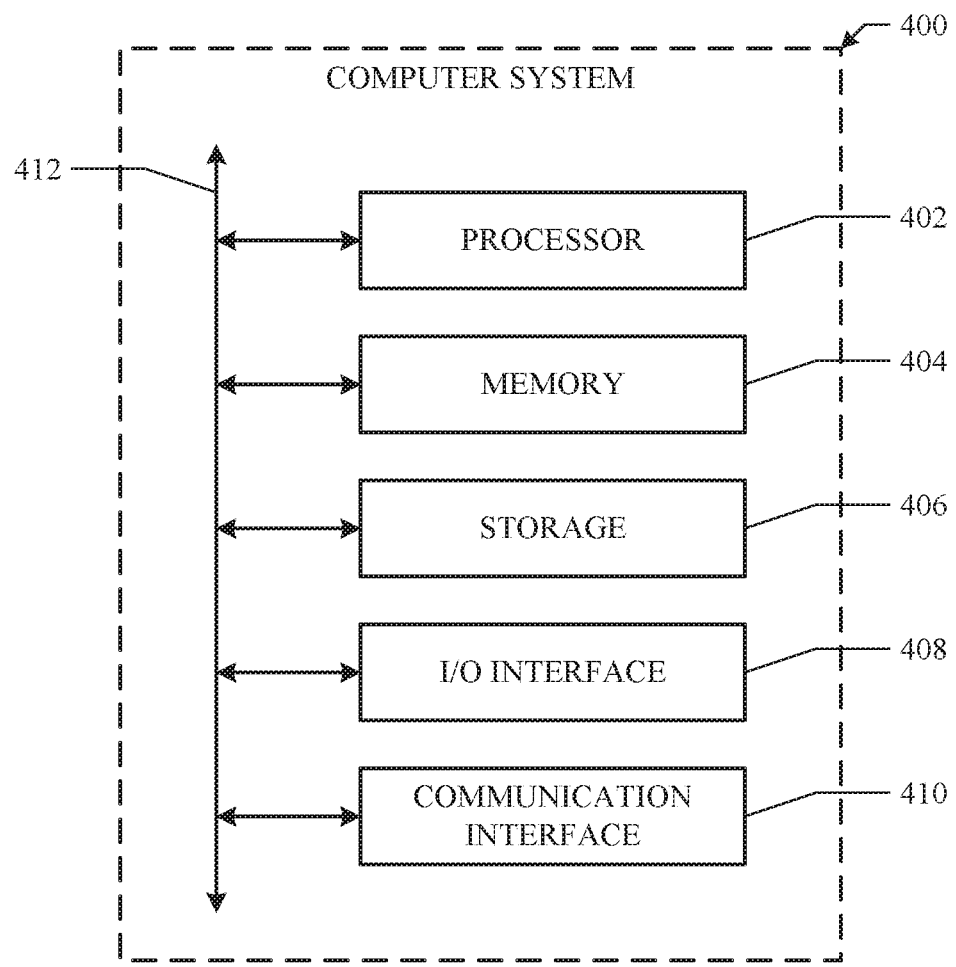
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computing device, obtaining a plurality of sparse features, a plurality of categorical features, and a plurality of numerical features;
    by the computing device, generating a plurality of different permutations of features, wherein each permutation of features comprises at least a first feature and a second feature arranged in a specific order that is different from other permutations of features, wherein the first feature is selected from the plurality of sparse features, and wherein the second feature is selected from the plurality of sparse features, the plurality of categorical features, or the plurality of numerical features;
    by the computing device, identifying a user account of a social networking system;
    by the computing device, generating, for each of the plurality of different permutations of features, one or more deep feature values associated with the user account of the social-networking system, the generating of the one or more deep feature values for the associated permutation of features comprising:
        extracting a first feature value associated with the user account using a social graph of the social networking system, wherein the first feature value corresponds to the first feature of the permutation of features;
        extracting a second feature value associated with the user account using the extracted first feature value and the social graph of the social networking system, wherein the second feature value corresponds to the second feature of the permutation of features; and
        using a combination of the first feature value and the second feature value to generate the one or more deep feature values corresponding to deep features for the permutation of features; and
    by the computing device, training a machine-learning model using the one or more deep feature values associated with the user account generated for each of the plurality of different permutations of features, wherein the trained machine-learning model is configured to use deep feature values associated with a second user account and classify whether the second user account is one of a fake user account or a spam user account on the social-networking system based on the deep feature values associated with the second user account.

2. The method of claim 1,
    wherein the step of generating the one or more deep feature values associated with the user account for the associated permutation of features further comprises:
        extracting a last feature value associated with the user account corresponding to a last feature of the permutation of features using an extracted second-to-last feature value associated with the user account corresponding to a second-to-last feature of the permutation of features, wherein the last feature is selected from the plurality of sparse features, the plurality of categorical features, or the plurality of numerical features;
        identifying one or more predefined aggregation operations configured to operate on a feature type of the last feature, wherein the feature type is selected from a sparse feature type, a categorical feature type, or a numerical feature type; and
        performing the one or more predefined aggregation operations using the extracted last feature value.

3. The method of claim 2, wherein the extracted first feature value is of the sparse feature type and comprises one or more sparse data, the method further comprising:
    selecting a time decay weight for each of the one or more sparse data based on a time information associated with each of the one or more sparse data; and applying to each of the one or more sparse data the corresponding selected time decay weight.

4. The method of claim 2, wherein the last feature is the second feature, the last feature value is the second feature value, the second-to-last feature is the first feature, and the second-to-last feature value is the first feature value.

5. The method of claim 1, wherein the training of the machine-learning model further comprises using the extracted first feature value associated with the user account.

6. The method of claim 1, further comprising:
accessing a target user account of the social networking system;
generating one or more second deep feature values associated with the target user account for each of the plurality of different permutations of features; and
classifying the target user account using the one or more second deep feature values and the trained machine-learning model.

7. The method of claim 6, wherein the target user account is classified as a likely spam account used for generating spam on the social networking system.

8. The method of claim 1, wherein each of the plurality of different permutations of features is limited to have no more than a predetermined number of features.

9. One or more computer-readable non-transitory storage media embodying software that is operable when executed by one or more processors to:
obtain a plurality of sparse features, a plurality of categorical features, and a plurality of numerical features;
generate a plurality of different permutations of features, wherein each permutation of features comprises at least a first feature and a second feature arranged in a specific order that is different from other permutations of features, wherein the first feature is selected from the plurality of sparse features, and wherein the second feature is selected from the plurality of sparse features, the plurality of categorical features, or the plurality of numerical features;
identify a user account of a social networking system;
generate, for each of the plurality of different permutations of features, one or more deep feature values associated with the user account of the social-networking system, the generation of the one or more deep feature values for the associated permutation of features comprising:
extracting a first feature value associated with the user account using a social graph of the social networking system, wherein the first feature value corresponds to the first feature of the permutation of features;
extracting a second feature value associated with the user account using the extracted first feature value and the social graph of the social networking system, wherein the second feature value corresponds to the second feature of the permutation of features; and
using a combination of the first feature value and the second feature value to generate the one or more deep feature values corresponding to deep features for the permutation of features; and
train a machine-learning model using the one or more deep feature values associated with the user account generated for each of the plurality of different permutations of features, wherein the trained machine-learning model is configured to use deep feature values associated with a second user account and classify whether the second user account is one of a fake user account or a spam user account on the social-networking system based on the deep feature values associated with the second user account.

10. The media of claim 9,
wherein the generation of the one or more deep feature values associated with the user account for the associated permutation of features further comprises:
extracting a last feature value associated with the user account corresponding to a last feature of the permutation of features using an extracted second-to-last feature value associated with the user account corresponding to a second-to-last feature of the permutation of features, wherein the last feature is selected from the plurality of sparse features, the plurality of categorical features, or the plurality of numerical features;
identifying one or more predefined aggregation operations configured to operate on a feature type of the last feature, wherein the feature type is selected from a sparse feature type, a categorical feature type, or a numerical feature type; and
performing the one or more predefined aggregation operations using the extracted last feature value.

11. The media of claim 10, wherein the extracted first feature value is of the sparse feature type and comprises one or more sparse data, wherein the software is further operable when executed by the one or more processors to:
select a time decay weight for each of the one or more sparse data based on a time information associated with each of the one or more sparse data; and
apply to each of the one or more sparse data the corresponding selected time decay weight.

12. The media of claim 10, wherein the last feature is the second feature, the last feature value is the second feature value, the second-to-last feature is the first feature, and the second-to-last feature value is the first feature value.

13. The media of claim 9, wherein the training of the machine-learning model further comprises using the extracted first feature value associated with the user account.

14. The media of claim 9, wherein the software is further operable when executed by the one or more processors to:
access a target user account of the social networking system;
generate one or more second deep feature values associated with the target user account for each of the plurality of different permutations of features; and
classify the target user account using the one or more second deep feature values and the trained machine-learning model.

15. A system comprising:
one or more processors; and
one or more computer-readable non-transitory storage media coupled to the one or more processors and comprising instructions operable when executed by the one or more processors to cause the system to:
obtain a plurality of sparse features, a plurality of categorical features, and a plurality of numerical features;
generate a plurality of different permutation of features, wherein each permutation of features comprises at least a first feature and a second feature arranged in a specific order that is different from other permutations of features, wherein the first feature is selected from the plurality of sparse features, and wherein the second feature is selected from the plurality of sparse features, the plurality of categorical features, or the plurality of numerical features;
identify a user account of a social networking system;

generate, for each of the plurality of different permutations of features, one or more deep feature values associated with the user account of the social-networking system, the generation of the one or more deep feature values for the associated permutation of features comprising:
- extracting a first feature value associated with the user account using a social graph of the social networking system, wherein the first feature value corresponds to the first feature of the permutation of features;
- extracting a second feature value associated with the user account using the extracted first feature value and the social graph of the social networking system, wherein the second feature value corresponds to the second feature of the permutation of features; and
- using a combination of the first feature value and the second feature value to generate the one or more deep feature values corresponding to deep features for the permutation of features; and train a machine-learning model using the one or more deep feature values associated with the user account generated for each of the plurality of different permutations of features, wherein the trained machine-learning model is configured to use deep feature values associated with a second user account and classify whether the second user account is one of a fake user account or a spam user account on the social-networking system based on the deep feature values associated with the second user account.

16. The system of claim 15,
wherein the generation of the one or more deep feature values associated with the user account for the associated permutation of features further comprises:
- extracting a last feature value associated with the user account corresponding to a last feature of the permutation of features using an extracted second-to-last feature value associated with the user account corresponding to a second-to-last feature of the permutation of features, wherein the last feature is selected from the plurality of sparse features, the plurality of categorical features, or the plurality of numerical features;
- identifying one or more predefined aggregation operations configured to operate on a feature type of the last feature, wherein the feature type is selected from a sparse feature type, a categorical feature type, or a numerical feature type; and
- performing the one or more predefined aggregation operations using the extracted last feature value.

17. The system of claim 16, wherein the extracted first feature value is of the sparse feature type and comprises one or more sparse data, wherein the processors are further operable when executing the instructions to:
- select a time decay weight for each of the one or more sparse data based on a time information associated with each of the one or more sparse data; and
- apply to each of the one or more sparse data the corresponding selected time decay weight.

18. The system of claim 16, wherein the last feature is the second feature, the last feature value is the second feature value, the second-to-last feature is the first feature, and the second-to-last feature value is the first feature value.

19. The system of claim 15, wherein the training of the machine-learning model further comprises using the extracted first feature value associated with the user account.

20. The system of claim 15, wherein the processors are further operable when executing the instructions to:
- access a target user account of the social networking system;
- generate one or more second deep feature values associated with the target user account for each of the plurality of different permutations of features; and
- classify the target user account using the one or more second deep feature values and the trained machine-learning model.

\* \* \* \* \*